United States Patent [19]

Dufour et al.

[11] 4,361,618

[45] Nov. 30, 1982

[54] PAPERMAKERS FELT WITH IMPROVED DRAINAGE

[75] Inventors: Marcel Dufour, St Yrieix; Ecrire Pascaud, Gond Pontouvre, both of France

[73] Assignee: Ascoe Felts, Inc., Clinton, S.C.

[21] Appl. No.: 265,187

[22] Filed: May 18, 1981

[51] Int. Cl.³ .............................................. B32B 5/06
[52] U.S. Cl. .................................. 428/234; 34/243 F; 139/383 A; 428/238; 428/239; 428/247; 428/257; 428/258; 428/259
[58] Field of Search ............... 428/234, 238, 239, 247, 428/257, 258, 259; 139/383 A; 34/243 F

[56] References Cited

U.S. PATENT DOCUMENTS

| | | | |
|---|---|---|---|
| 2,165,772 | 7/1939 | Walsh | 428/234 |
| 4,119,753 | 10/1978 | Smart | 428/234 |
| 4,224,372 | 9/1980 | Romanski | 428/257 |

FOREIGN PATENT DOCUMENTS 2003948 9/1978 United Kingdom .

Primary Examiner—Marion McGamish
Attorney, Agent, or Firm—Benasutti Associates, Ltd.

[57] ABSTRACT

A papermaker's felt having improved water drainage properties for use in the press or dewatering section of papermaking machinery. The felt is formed by a base fabric comprised of machine and cross machine direction yarns in a plurality of large cable yarns which are secured to the base fabric by selected interweavings with the cross machine direction yarns. A felt batt is needled to the paper carrying surface of the felt and a second batt is needled to the machine or cable side of the fabric. The cables are maintained in a secured position generally spaced between pairs of machine direction yarns in the base fabric by means of the interweaving with the cross direction yarns.

21 Claims, 3 Drawing Figures

PAPERMAKERS FELT WITH IMPROVED DRAINAGE

BACKGROUND OF THE INVENTION

This invention relates to papermakers fabrics or felts intended for use in the watering sections of a papermakers machine. This invention relates particularly to channel type or cabled papermakers felt for use in the press or dewatering section of a papermakers machine.

It has been recognized for some time that it would be advantageous to have a papermakers felt having channels or voids for directing the water removed from the paper slurry away from the papermakers felt so as to prevent rewetting of the slurring. There have been various attempts to accomplish this by using batt on base type fabrics. In more recent attempts to produce a papermakers felt having improved drainage properties, prior art has attempted to secure cable or drainage yarns to the base of a fabric by use of adhesives, see U.S. Pat. No. 3,616,258; and to secure cable or drainage yarns to the running surface of the fabric by means of stitch or bindery yarns, see U.S. Pat. No. 4,187,618.

The difficulty with prior art attempts to produce a fabric having improved drainage qualities has been the failure of the fabrics to indure sustained running periods and to indure the riggers of papermakers machinery. In the case of the adhesive held cable yarns it has been found that the adhesive may become cracked, brittle or fragmented and thereby lose control over the cable yarns. The prior art attempts to use binder yarns have run into difficulty in that the binder yarns may be subject to extreme conditions in the papermaking machinery and therefore become frayed and lose control of the cable yarns. Due to the nature of binder yarns which limits the number of yarns which were inserted in a fabric in order to maintain the desired porosity the fatigue of the binder yarn can cause some difficulty.

SUMMARY OF THE INVENTION

The instant invention comprises a papermakers felt having a base fabric comprising at least first and second machine direction yarn systems, said second direction yarn system comprised of cable yarns which are fewer in number and greater in diameter in the yarns of the first machine direction yarn system; and at least one cross machine yarn system, said cross machine yarn system having selected yarns within a repeat pattern which interweave with said cable yarns, each of said selected cable yarns to interweave with one cable yarn within a repeat pattern. A first batt is needled to the base fabric on the paper carrying side and a second batt is needled to the base fabric adjacent to said cable yarns.

It is an object of this invention to provide a papermaker felt having improved drainage qualities without the use of adhesives or the addition of binder yarns to the weave of the fabric.

DESCRIPTION OF THE PREFERRED EMBODIMENT

The papermakers felt, according to the instant invention, will be described in detail with reference to the attached figures. Like numerals in all figures, indicate like elements.

Figure 1:
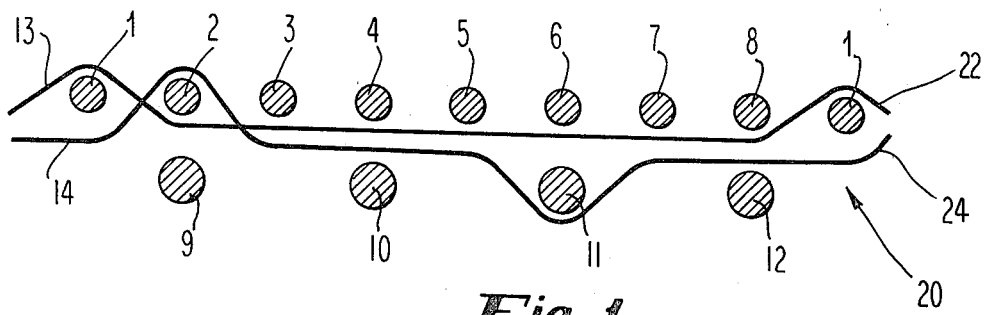
FIG. 1 is a section through the base fabric taken in a cross machine direction.

Referring now to FIG. 1, there is shown the base fabric 20, having an upper plane 22 and a lower plane 24 of parallel yarns. The upper plane 22 is the produce side of the base fabric and is comprised of eight machine direction yarns and eight cross machine direction yarns per repeat. The lower plane 24, is the void forming of the fabric and determines the drainage characteristics of the fabric.

For simplicity of illustration in FIG. 1, two cross machine direction yarns, 13 and 14, eight machine direction yarns 1 through 8 in the upper plane 22, and four machine direction drainage yarns 9 through 12 in plane 24, are illustrated.

Cross machine direction yarn 13 will illustrate the weave repeat pattern for yarns which do not weave into the lower plane 24 and cross machine direction yarn 14 will illustrate the weave repeat pattern for yarns which do weave the lower plane 24. Cross machine direction yarns 14 will unify upper plane 22 and lower plane 24 to form the base fabric 20. It should be noted at this point that machine direction yarns 1 through 8, are generally of a larger denier than yarns 13 and 14 and machine direction yarns, 9 through 12, are generally of a larger denier than any other yarns in the fabric. Machine direction yarns, 9 through 12, may be referred to as cable yarns in that they are generally of substantially larger denier than the yarns 1 through 8.

Cross machine direction yarn 13, passes over machine direction yarn 1 and under yarns 2 through 8. Cross machine direction yarn 14 passes under machine direction yarn 1, between machine direction yarns 1 and 2 and over machine direction yarns 2 and 3, floats under yarns 3 through 5, over yarn 10, between yarns 10 and 11, under yarn 11, between yarns 11 and 12, under yarn 7 and between yarns 8 and 12 to form a repeat as shown.

The remaining six cross machine direction yarns of the base fabric 20 are not shown for purposes of clarity in illustration. What follows is a description of how they interweave. The next cross machine direction yarn in plane 22, would weave according to the pattern of yarn 13, and would pass between machine direction yarns 2 and 3, over machine direction yarn 4, and between machine direction yarns 3 and 4. The next cross machine direction yarn to weave in planes 22 and 24 weave according to the pattern of yarn 14. The yarn would pass under yarns 1, 2, and 3, between yarns 3 and 4, over yarn 4, between yarns 4 and 5, under yarns 5, 6, and 7, and interlace with yarn 12 as previously described for the repeat of yarn 14. The next cross machine direction yarn would weave according to the pattern of yarn 13 and would pass over yarn 5 as previously described for yarns to this pattern. The next yarn would weave according to the yarn 14, and it would pass beneath yarn 9 and over yarn 6 as previously described witih regard to the pattern of yarn 14. The next yarn would weave according to the pattern of yarn 13 and would pass over yarn 7. The next yarn would weave according to the pattern of yarn 14, would pass beneath yarn 10, and over yarn 8, as previously described in that repeat pattern.

As will be recognized by those skilled in the art, FIG. 1 is a representation of the weave and the actual fabric may vary from that representation. For example, it has been found with the instant fabric that the large cable like yarns, 9 through 12, will tend to migrate in the weave, so as to be centered beneath a pair of the lesser denier machine direction yarns 1 through 8. That is to say, that yarn 9 will migrate to a point generally centered between yarns 1 and 2, yarn 10 will migrate to a point generally centered between 3 and 4, yarn 11 will migrate to a point generally centered between 7 and 8. As a result of this migration, you develop a regular pattern of voids between the cable yarns 9 through 12.

It should be noted at this point that the weave according to the instant invention provides a strong base fabric having an open weave construction. In the preferred embodiment, the cross machine direction yarns 13 and 14 are synthetic monofilament; the machine direction yarns 1 through 8 are preferrably synthetic plied yarns having a diameter on the order of three times the diameter of the cross machine direction yarns 13 and 14. The machine direction yarns 9 though 12, while it is possible to use single monofilament yarns, are preferably plied monofilament or cut staple synthetic yarns having a diameter in the order of three times the diameter of machine direction yarns 1 through 8.

Figure 2:
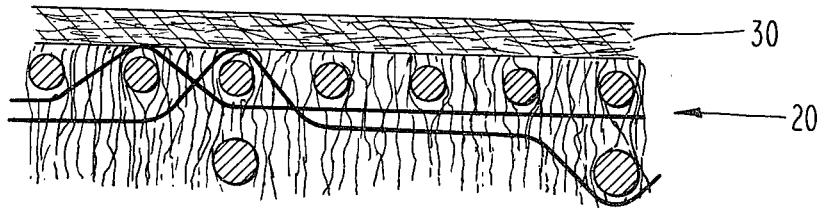
FIG. 2 is a section through the batt on base fabric taken in a cross machine direction.

Referring now to FIG. 2, there is shown the base fabric 20 with a batt 30 needled thereto. The batt 30 may be of woven or non-woven construction and is needled to the base fabric 20 according to techniques known to those skilled in the art. Batt 30 will form the upper surface or the paper carrying surface of the completed fabric.

Figure 3:
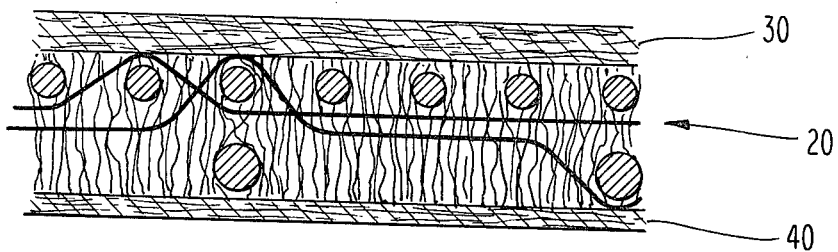
FIG. 3 is a section through the completed felt taken in a cross machine direction.

Referring now to FIG. 3, there is the fabric of FIG. 2 having a second batt 40 needled to the lower plane of the base fabric. Second batt 40 is approximately half the thickness of batt 30. As illustrated in FIG. 3, the completed felt will have sufficient structural integrity to preserve the spacing or voids between the cable yarns 9, 10, and 11. As noted previously, the cable yarns 9, 10, and 11 will migrate between pairs of the yarns 1 through 8. Thus, the cable yarns become runners or carriers for the fabric and thereby provide water drainage channels through the voids between the yarns 9, 10, 11, 12, etc. In addition, it should be noted that the use of selected cross machine yarns to secure the cable yarns to the fabric eliminates the need for binder yarns or adhesives to secure the cable yarns. This construction provides improved drainage properties in the fabric, as well as, structural integrity.

Upper plane 22 in conjunction with the batt 20 provides substantial support for the paper product while the lower plane 24 provides the void structure desired for improved drainage. The disclosed fabric also provides substantial fabric integrity and resist the migration of yarns into the void areas. In addition, there are no adhesives or chemical bonds which may have an adverse effect on the fabric properties.

It will be understood that various changes in the details, materials and arrangements of parts which have been herein described and illustrated in order to explain the nature of this invention may be made by those skilled in the art within the principle and scope of the invention as expressed in the following claims.

We claim:
1. A papermaker's felt comprising:
(a) a base fabric, said base fabric further comprising:
 (i) at least first and second machine direction yard systems, said second machine direction yarn system comprised of cable yarns which are fewer in number and greater in diameter than the yarns of said first machine direction yarn system and
 (ii) at least one a cross machine yarn system interwoven with said first machine direction yarn system in a selected repeat pattern, said cross machine yarn system having selected yarns within said repeat pattern which interweave with said cable yarns, each of said selected yarns to interweave with one cable yarn within said repeat pattern;
(b) a first batt needled to said base fabric; and
(c) a second batt needled to said base fabric adjacent to said cable yarns.

2. The papermaker's felt of claim 1 wherein:
(a) alternating yarns within said repeat pattern of the cross machine yarn system are selected to interweave with said cable yarns.

3. The papermaker's felt of claim 2 wherein:
(a) each of said alternating yarns within said repeat pattern interweaves with a yarn of said first machine direction systems, floats under a plurality of first machine direction yarns, interweaves with one of said cable yarns and floats under a second plurality of first machine direction yarns.

4. The papermaker's felt of claim 3 wherein:
(a) the remaining yarns within said repeat pattern of said cross machine direction yarns interweave with the yarns of said first machine direction system by passing over one yarn within said repeat pattern and floating under the remaining yarns within said repeat pattern.

5. The papermaker's felt of claim 1 wherein said base fabric is constructed using synthetic yarns.

6. The papermaker's felt of claim 1 wherein:
said first machine direction yarn system is comprised of synthetic monofilament yarns.

7. The papermaker's felt of claim 6 wherein:
said second machine direction yarn system is comprised of plied synthetic monofilament yarns.

8. The papermaker's felt of claim 6 wherein:
said second machine direction yarn system is comprised of cut staple synthetic yarns.

9. The papermaker's felt of claim 7 or 8 wherein:
said second machine direction yarn system is comprised of yarns having a diameter on the order of three times the diameter of said first machine direction yarns.

10. A papermaker's felt having improved drainage, said felt comprising:
a base fabric, said fabric further comprising
 (i) first machine direction yarn system having an even number of yarns therein;
 (ii) second machine direction yarn system having cable yarns which are half in number and greater in diameter than the yarns of said first machine direction yarn system; and
 (iii) at least one cross machine direction yarn system interwoven with said first machine direction yarn system in a selected repeat pattern, said cross machine yarn system having selected yarns within said repeat pattern which interweave with said cable yarns, each of said selected yarns interwoven with one cable yarn within said repeat pattern and maintaining said one cable yarn between a respective pair of yarns of said first machine direction yarn system.

11. The papermaker's felt of claim 10 further comprising:
a first batt needled to base fabric.

12. The papermaker's felt of claim 11 further comprising:
a second batt needled to said base fabric adjacent to said cable yarns.

13. The papermaker's felt of claim 10 wherein:
said first machine direction yarn system is comprised of snythetic monofilament yarns.

14. The papermaker's felt of claim 13 wherein:
said second machine direction yarn system is comprised of plied synthetic monofilament yarns.

15. The papermaker's felt of claim 13 wherein:
said second machine direction yarn system is comprised of cut staple synthetic yarns.

16. The papermaker's felt of claim 14 or 15 wherein:
said second machine direction system is comprised of yarns having a diameter on the order of three times the diameter of said first machine direction yarns.

17. A papermaker's felt comprising:
a base fabric, including
(i) a first machine direction yarn system;
(ii) a second machine direction yarn system comprised of cable yarns which are fewer in number and greater in diameter than the yarns of said first machine direction yarn system thereby defining a selected ratio therebetween;
(iii) a cross machine yarn system interwoven with said first machine direction yarn system defining a selected repeat pattern; and
(iv) selected yarns of said cross machine yarn system also interwoven with said second machine direction system defining a selected sub-repeat pattern within said repeat pattern such that the ratio between the number of yarns in said repeat pattern and the number of yarns also in said sub-repeat patterns equals said yarn ratio between said first and second machine direction yarn systems.

18. A papermaker's felt according to claim 17 further comprising:
a first batt needled to said base fabric; and
a second batt needled to said base fabric adjacent to said cable yarns.

19. The papermaker's felt according to claim 17 or 18 wherein: said selected ratio is 2:1.

20. The papermaker's felt according to claim 19 wherein:
alternating cross machine yarns define said sub-repeat pattern.

21. The papermaker's felt according to claim 20 wherein:
said repeat pattern is defined by eight cross machine yarns.

* * * * *